United States Patent [19]

Nakayama et al.

[11] Patent Number: 6,023,053
[45] Date of Patent: Feb. 8, 2000

[54] LASER OUTPUT MEASURING APPARATUS

[75] Inventors: Shin-ichi Nakayama; Kaoru Nakayama, both of Chiba-ken, Japan

[73] Assignee: Miyachi Technos Corporation, Noda, Japan

[21] Appl. No.: 09/252,935

[22] Filed: Feb. 19, 1999

[30] Foreign Application Priority Data

Feb. 24, 1998 [JP] Japan .................................. 10-059011

[51] Int. Cl.⁷ ..................................................... H05B 1/02
[52] U.S. Cl. ............................................................ 219/501
[58] Field of Search ................................ 219/121.6, 497, 219/501, 505, 494; 356/218, 256; 236/DIG. 15; 374/32, 41

[56] References Cited

U.S. PATENT DOCUMENTS

| | | | |
|---|---|---|---|
| 4,413,446 | 11/1983 | Rogers | 219/501 |
| 4,440,506 | 4/1984 | Eitel | 374/32 |
| 4,865,446 | 9/1989 | Inoue et al. | 356/216 |
| 5,156,459 | 10/1992 | Baker | 374/41 |

*Primary Examiner*—Mark Paschall
*Attorney, Agent, or Firm*—Wenderoth, Lind & Ponack, L.L.P.

[57] ABSTRACT

A laser beam LB, which has entered a housing, travels via a reflection mirror and through a beam diffusion plate, ND filters 42 and a visible rays cut-off filter 44 to impinge on a beam receiving surface of a photodiode 46. A resistance heating element 48 in the form of, e.g., a metal film resistor and a power transistor 50 for the supply of electric power to the resistance heating element 48 are fixedly secured by bolts via respective insulating sheets with thermal conductivity to external wall surfaces of thick sidewalls 28d and 28e of a thermally conductive second retainer 28. The second retainer 28 is heated by both heat generated by the resistance heating element 48 and heat generated by the transistor 50. The second retainer 28 is provided also with a temperature sensor 52. A temperature control circuit accepts an output signal from the temperature sensor 52 and provides control of an output signal from the transistor 50 so as to allow the temperature of the second retainer 28 to conform to a set temperature.

4 Claims, 6 Drawing Sheets

LASER OUTPUT MEASURING APPARATUS

BACKGROUND OF THE INVENTION

1. Field of the Invention

The present invention relates to a photo-detective-type laser output measuring apparatus.

2. Description of the Related Arts

In the field of laser processing for example use has been made of laser output measuring apparatuses for detecting the output (beam intensity) of laser beams to provide automatic control of the processing qualities. In general the laser output measuring apparatuses are roughly divided into two types, that is, a calorie measurement type using photothermal converters such as calorimeters and a beam detecting type using photoelectric converting elements such as photodiodes. Recently prevailing is the beam detecting type from the viewpoint of response speed.

Inconveniently such type of photoelectric converting elements have photoelectric conversion characteristics varying depending on the temperatures, so that they may issue different output signals in spite of reception of beams having the same output. Therefore if the photoelectric converting elements are subjected to the influence of ambient temperatures (atmospheric or room temperatures) they will issue different output signals even though the laser beam outputs are the same between morning and daytime, resulting in different laser output measurement values.

Thus it is common to be provided with temperature control devices for keeping the photoelectric converting elements at certain temperatures without being influenced by the ambient temperatures. Existing typical temperature control devices comprise thermally conductive retainers each mounted with not merely the photoelectric converting element but also with a resistance heating element and a temperature sensor. Then the retainer is heated by heat generated by the resistant heating element through the supply of electricity thereto while simultaneously the temperature of the retainer is detected by the temperature sensor to provide on-off control of the heat generating action of the resistance heating element with the aim of keeping the temperature of the retainer at a certain value.

In the on-off-controlled temperature control devices as described above, heating (on) and cooling (off) actions alternate, with the result that disadvantageously the temperature of the retainer or the photoelectric converting element may fluctuate periodically in the vicinity of the set temperature and the resultant ripple may act adversely on the output signal of the photoelectric converting element and hence on the laser output measurement values.

One possible solution to this problem is to employ PI (proportional integration) control method or PWM control method as the control methods for temperature control. These control methods allow the resistance heating elements to generate heat continuously (without cease) to variably control the amount of heat generation thereof, thus providing ripple-free temperature controls.

However, both the methods include costly control circuits and hence will cause a rise in total costs unless specific measures are taken, lacking in cost effectiveness of the ripple prevention. In addition the PWM control method may generate noises in its high-frequency switching circuit which may get in the measuring circuit associated with the photoelectric converting element. This would also make it hard to employ the method.

SUMMARY OF THE INVENTION

The present invention was conceived in view of the above problems. It is therefore an object of the present invention to provide a laser output measuring apparatus capable of providing a less fluctuated, stable temperature control with a lower power consumption in an effective and easy manner as well as ensuring highly reliable laser output measurement values at a lower cost from total viewpoints.

Another object of the present invention is to provide a laser output measuring apparatus ensuring stable laser output measurement values against any possible fluctuations in temperature.

In order to attain the above objects, according to a first aspect of the present invention there is provided a laser output measuring apparatus for measuring the output of a laser beam, comprising a photoelectric converting element for receiving the laser beam to convert the output of the laser beam into an electric signal; a thermally conductive retainer for retaining the photoelectric converting element; a heating element secured to the retainer in a thermally coupled manner, for generating heat by the supply of electric current; a heat-radiating power transistor secured to the retainer in a thermally coupled manner, for supplying the heating element with electric power; a temperature sensor for detecting the temperature of the retainer; and a temperature control circuit for providing a control of output current from the transistor in response to an output signal from the temperature sensor so as to allow the temperature of the retainer to conform to a set temperature.

In the laser output measuring apparatus described above, the temperature control circuit may include a reference value generator for generating a reference value corresponding to the set temperature; a comparing circuit for making a comparison of the output signal from the temperature sensor to the reference value corresponding to the set temperature to generate an error signal indicative of a comparison error therebetween; an amplifying circuit for proportional control, for proportionally amplifying the error signal with a predetermined amplification factor; an integrating circuit for integral control, for integrating the error signal; an adding circuit for adding together an output signal from the amplifying circuit and an output signal from the integrating circuit; and a driving circuit for controlling the output current from the transistor with a constant current, in response to the output signal from the adding circuit.

According to a second aspect of the present invention there is provided a laser output measuring apparatus for measuring the output of a laser beam, comprising a photoelectric converting element for receiving the laser beam to convert the output of the laser beam into an electric signal; an operational amplifier for accepting a current signal from the photoelectric converting element to issue a voltage signal corresponding to the current signal; and a feedback circuit connected between an input terminal and an output terminal of the operational amplifier, the feedback circuit including a first resistor having a positive temperature coefficient and a second resistor having a negative temperature coefficient.

The laser output measuring apparatus described above may further comprise temperature control means for controlling the temperature of the photoelectric converting element to a set temperature so as to allow the temperature at the maximal point or the minimal point on a temperature characteristic curve of laser output measurement values acquired at the output terminal of the operational amplifier to be adjusted in the close vicinity of the set temperature.

According to the present invention, not merely the intrinsic heating element for heating but also the power transistor for the supply of electric power to the heating element is mounted in a thermally coupled manner on the thermally conductive retainer for retaining the photoelectric converting element, with provision of control of the output current from the transistor to cause the temperature of the retainer to coincide with the set temperature, whereby stable temperature control with less fluctuation can effectively and easily be achieved with a lower power consumption, making it possible to acquire highly reliable laser output measurement values at a lower cost from total viewpoints.

Furthermore, according to the present invention, the feedback circuit for the operational amplifier for converting a current signal from the photoelectric converting element into a voltage signal is provided in the form of a combined transistor consisting of a resistor having a positive temperature coefficient and a resistor having a negative temperature coefficient whereby stable laser output measurement values against any possible fluctuations in temperature can be achieved.

BRIEF DESCRIPTION OF THE DRAWINGS

The above and other objects, aspects, features and advantages of the present invention will become more apparent from the following detailed description with reference to the accompanying drawings, in which.

DESCRIPTION OF THE PREFERRED EMBODIMENTS

The present invention will now be described with reference to the accompanying drawings which illustrate preferred embodiments thereof in a non-limitative manner.

Figure 1:
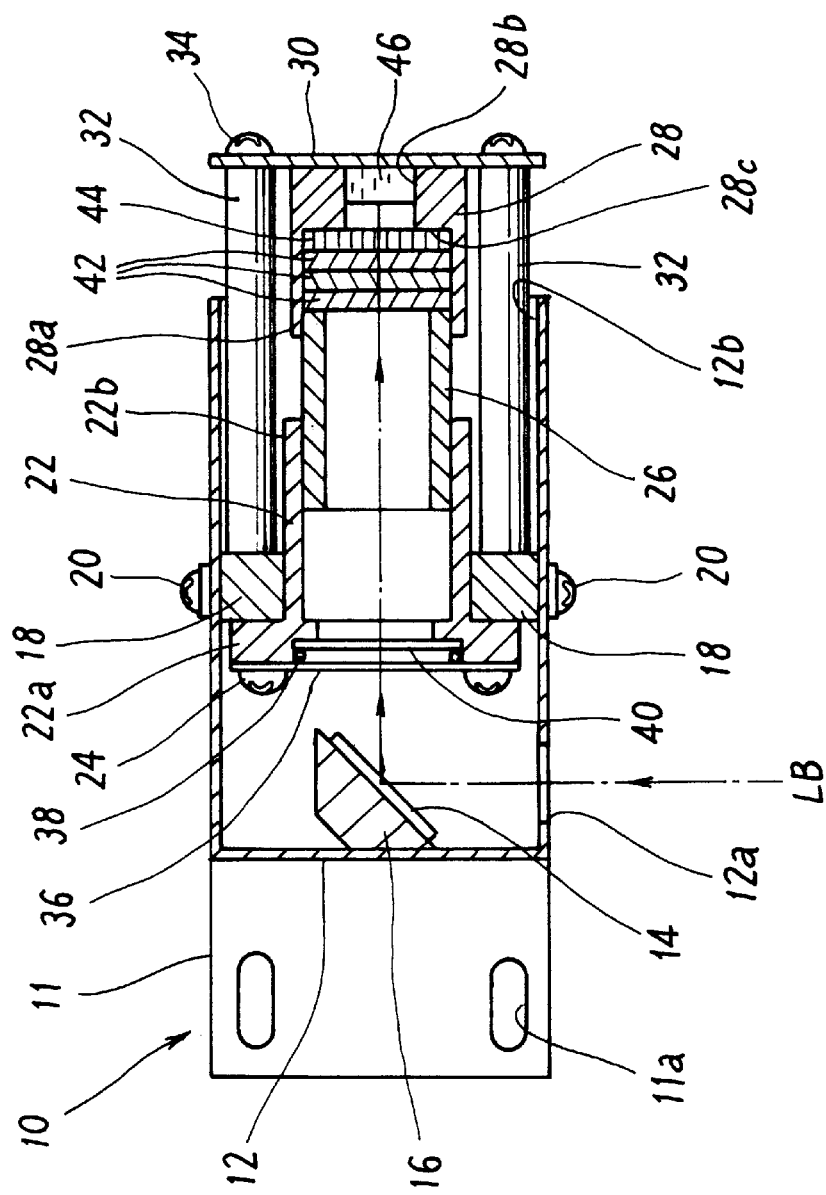
FIG. 1 is a longitudinal sectional view showing an overall configuration of a beam receiving unit of a laser output measuring apparatus in accordance with an embodiment of the present invention.
Figure 2:
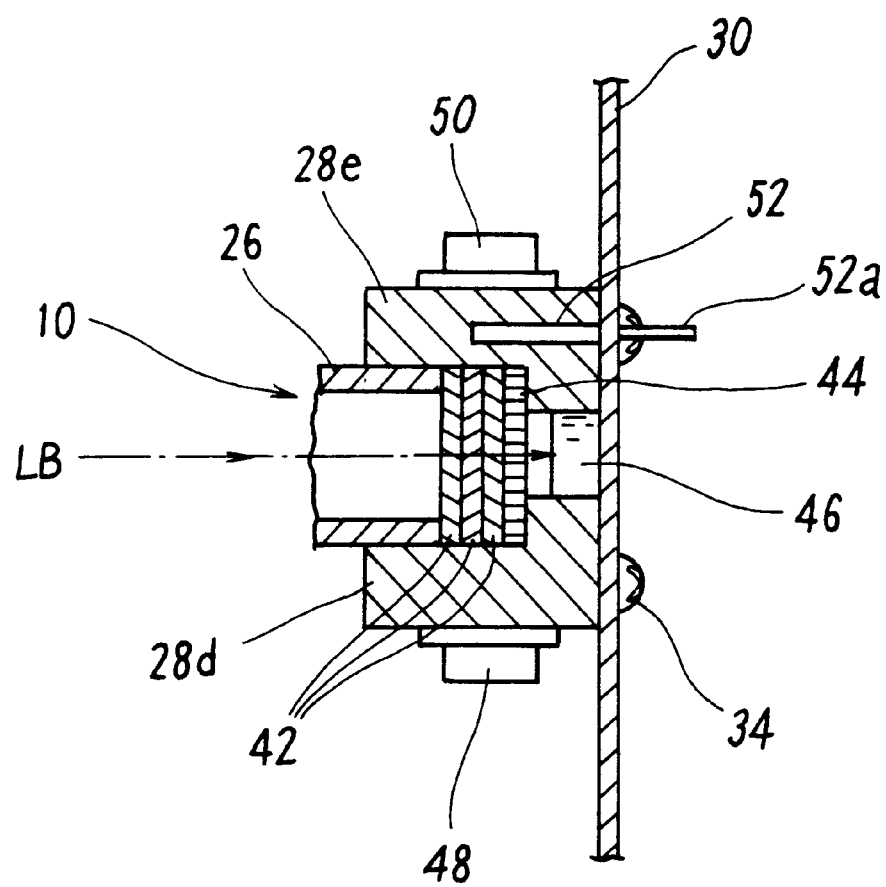
FIG. 2 is a partially sectional view showing a configuration of a principal portion of the beam receiving unit in the embodiment.

FIG. 1 is a longitudinal sectional view showing a general configuration of a laser beam receiving unit of a laser output measuring apparatus in accordance with an embodiment of the present invention and FIG. 2 is a partially sectional view showing a principal portion of the beam receiving unit.

In the laser beam receiving unit indicated generally at 10 a box-shaped housing 12 is provided on a mounting base plate 11 and has a laser beam introduction window 12a formed in its one sidewall. Within the housing 12 a reflection mirror 14 is mounted on a mirror support 16 such that it is directed at 45 degrees relative to the laser beam introduction window 12a. An opening 12b is formed at the side of the housing 12 in the direction of reflection when viewed from the reflection mirror 14.

At the mid portion of the housing 12 a pair of rod-like support members 18 are secured by bolts 20 to the sidewall and a facing sidewall of the housing 12 respectively, the members 18 extending in the direction orthogonal to the optical axis. One open end portion (laser beam inlet portion) 22a of a first retainer 22 in the shape of a quadratic tube and made of an insulating material with light shielding properties, for example, resin, is secured by bolts 24 to the rod-like support members 18.

At the vicinity of the opening 12b of the housing 12 one open end portion (laser beam inlet portion) 28a of a second retainer 28 of a quadratic tubular geometry made of a metal with high thermal conductivity, for example, aluminum is connected to the other open end portion (laser beam outlet portion) 22b of the first retainer 22 by way of a connecting member 26 of a quadratic tubular geometry made of an insulating material with light shielding properties, for example, resin. A circuit board 30 is connected to the other open end portion (laser beam outlet portion) 28b of the second retainer 28. Four rod-like support members 32 extending in parallel with the optical axis are secured at their one ends to the pair of rod-like support members 18, with the circuit board 30 being rigidly fastened by bolts 34 to the other ends of the rod-like support members 32. The mounting base plate 11 has at its four corners mounting holes 11a for the insertion of bolts.

A dust-preventive glass plate 36 is attached to the laser beam inlet portion 22a of the first retainer 22, with a beam diffusion plate 40 being disposed via an O-ring 38 onto the inner side of the glass plate 36. Toward the far side from the laser beam inlet portion 28a, the second retainer 28 is provided with a plurality of, e.g., three ND (neutral density) filters 42 and a visible rays cut-off filter or infrared rays transmission filter 44 which are arranged side by side in the mentioned order in the direction of the optical axis. At the vicinity of the laser beam outlet portion 28b the second retainer 28 is provided with a photoelectric conversion element, e.g., PIN photodiode 46 mounted on the circuit board 30 in such a manner that its beam receiving surface is directed toward the filters.

The inner wall surface of the second retainer 28 is formed with a step 28c slightly apart toward the center from the beam receiving surface of the photodiode 46, the step 28c serving as a stopper against which the optical filters 42 and 44 are pressed by the end surface of the tubular connecting member 26 whereby the optical filters 42 and 44 are rigidly retained within the second retainer 28.

A laser beam is issued from, e.g., a laser oscillation unit not shown and is directed onto a beam splitter not shown. A part (e.g., 1%) of laser beam LB is reflected at the beam splitter and enters the laser beam introduction window 12a. After having advanced to the interior of the housing 12 the laser beam LB has an optical path which is turned 90 degrees by the reflection mirror 14 and passes through the glass plate 36, the beam diffusion plate 40, the ND filters 42 and the visible rays cut-off filter 44 to strike on the beam receiving surface of the photodiode 46.

Four sidewalls of the second retainer 28 include a pair of thin sidewalls which confront each other as shown in FIG. 1 and a pair of thick sidewalls which confront each other as shown in FIG. 2.

As illustrated in FIG. 2, via an insulating sheet with thermal conductivity not shown, a resistance heating element 48 in the form of a metal film resistor for example is fixedly secured by a bolt not shown to the external wall surface of one of the pair of thick sidewalls 28d of the second retainer 28. Also, via an insulating sheet with thermal conductivity not shown, a transistor 50 is fixedly secured by a bolt to the external wall surface of the other of the pair of thick sidewalls 28e of the second retainer 28.

The resistance heating element 48 is supplied continuously with electric current (electric power) for resistance heating from the transistor 50 under control of a temperature control circuit described later which is mounted on the circuit board 30 or another circuit board not shown. The resistance heating element 48 is fastened with thermal coupling to the second retainer 28, so that the second retainer 28 is heated by heat generated by the resistance heating element 48.

On the other hand, the transistor 50 also generates heat and radiates it since electric current to be supplied to the resistance heating element 48 flows continuously through its internal resistor. Then the transistor 50 is also fastened with thermal coupling to the second retainer 28, so that the second retainer 28 is heated also by heat generated by the transistor 50.

In the laser output measuring apparatus of this embodiment in this manner, the arrangement of the laser beam receiving unit 10 is such that not merely the intrinsic resistance heating element 48 for heating but also the heat radiating transistor 50 for supply of electric power to the resistance heating element 48 is thermally coupled and fastened to the thermally conductive second retainer 28 for retaining the photodiode 46 and the optical filters 42 and 44, whereby the second retainer 28 is heated by the combination of heat generated by the resistance heating element 48 and heat generated by the transistor 50.

A temperature sensor, e.g., thermistor 52 is implanted in the interior of the thick sidewall 28e of the second retainer 28. A terminal 52a of the temperature sensor 52 protrudes from the external surface of the circuit board 30 and is connected via wiring on the circuit board 30 to an input terminal of the temperature control circuit.

Figure 3:
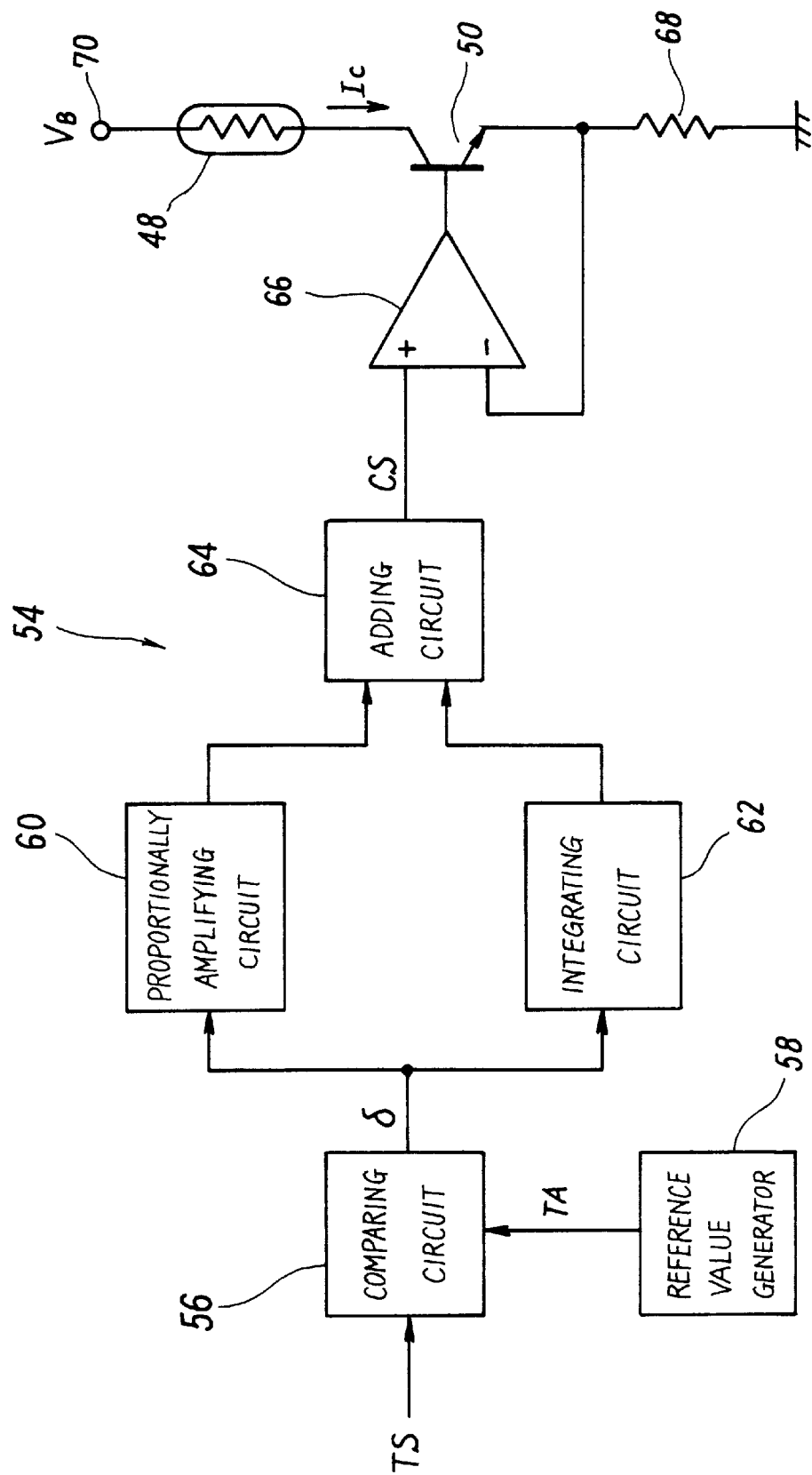
FIG. 3 is a block diagram showing a circuit configuration of a temperature control circuit in the embodiment.

Referring to FIG. 3 there is depicted a circuit configuration of the temperature control circuit for use in this embodiment. This temperature control circuit designated generally at 54 comprises an analog comparing circuit 56, a reference value generator 58, a proportionally amplifying circuit 60, an integrating circuit 62, an adding circuit 64 and an operational amplifier 66 so as to provide a PI control method temperature control.

The comparison circuit 56 compares a temperature detection signal TS from the temperature sensor 52 to a reference value TA corresponding to a set temperature (e.g., 45° C.) from the reference value generator 58, to generate an error signal δ indicative of a comparison error (TA−TS). The error signal δ from the comparing circuit 56 is proportionally amplified by the proportionally amplifying circuit 60 and simultaneously is integrated by the integrating circuit 62, output signals from both of which circuits 60 and 62 are added together by the adding circuit 64 so that the sum is fed as a control signal CS to a non-inverting input terminal of the operational amplifier 66.

An output terminal of the operational amplifier 66 is connected to a base terminal of the NPN power transistor 50 while an inverting input terminal thereof is connected to an emitter terminal of the transistor 50 and is connected via a resistor 68 to the ground. Then a collector terminal of the transistor 50 is connected via the resistance heating element 48 to a voltage terminal 70 at a power supply voltage $V_B$. These operational amplifier 66, transistor 50, resistor 68 and power supply voltage $V_B$ constitute in cooperation a constant current circuit for supplying a certain output current IC in response to the control signal CS to the resistance heating element 48.

When the temperature of the second retainer 28 has become lower than the set temperature in this temperature control circuit 54, the comparing circuit 56 generates a positive error signal +δ to add to the control signal CS to increase the output current $I_C$ from the transistor 50. Then heats generated by the resistance heating element 48 and the transistor 50, respectively, build up so that the temperature of the second retainer 28 rises.

On the contrary, when the temperature of the second retainer 28 has become higher than the set temperature, the comparing circuit 56 generates a negative error signal −δ to diminish the control signal to reduce the output current $I_C$ from the transistor 50. Then heats generated by the resistance heating element 48 and the transistor 50, respectively, become less so that the temperature of the second retainer 28 lowers.

Thus the resistance heating element 48 and the transistor 50 generate respective heats in response to the output current $I_C$ from the transistor 50 so that the combined heats raise the temperature of the second retainer 28 whereby continuous control is provided without cease to the output current $I_C$ of the transistor 50 so as to ensure that the temperature of the second retainer 28 coincides with the set temperature.

By virtue of the effect that the temperature of the second retainer 28 is kept stably at the close vicinity of the set temperature in this manner, the optical filters 42 and 44 and the photodiode 46 retained by the second retainer 28 can act at substantially a constant temperature irrespective of the ambient temperature and without being influenced by energy of the laser beam LB. This assures a highly reliable laser output measurement value with a higher accuracy.

Furthermore, not merely generation of heat by the intrinsic resistance heating element 48 for heating but also generation of heat by the transistor 50 for supplying electric power thereto contributes to the rise in the temperature of the second retainer 28 whereby there can be achieved a higher heating efficiency and accordingly a saving of power consumption. Since the PI control requires a continuous supply of electric current for heat generation, the effect of saving of the power consumption will be essential.

The temperature control circuit 54 allows the output current (collector current) $I_C$ from the transistor 50 to be controlled by means of the constant current circuit so as to provide easy and accurate control of the total heat generation value or the heating value. Therefore designing and fabrication thereof are comparatively easy although it is fairly costly as a hardware circuit compared with the conventional on-off control method control circuit.

Combination of this easiness in designing and the above advantage of low power consumption enables the total cost of the apparatus to be suppressed as low as possible. Furthermore due to no necessity for high frequency switching action as required in the PWM control method control circuit, there is no risk that noises may be imparted to the measuring circuit associated with the photodiode 46.

Figure 4:
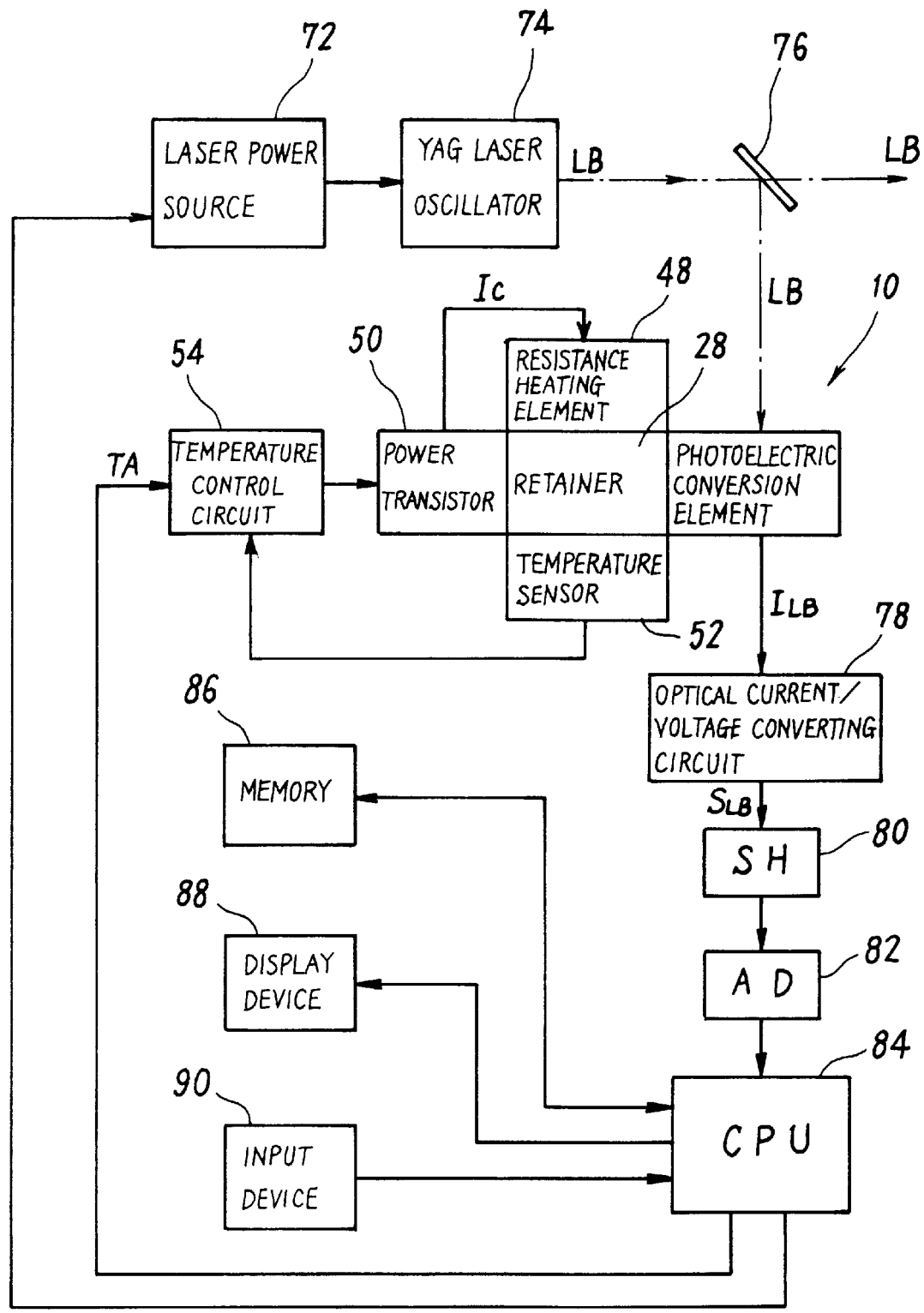
FIG. 4 is a block diagram showing a configuration of a YAG laser processing system to which is applied the laser output measuring apparatus in accordance with the embodiment.

FIG. 4 illustrates a configuration of a YAG laser processing system to which is applied the laser output measuring apparatus in accordance with this embodiment. In FIG. 4 corresponding parts to those in FIGS. 1 to 3 are designated by the same reference numerals.

This YAG laser processing system provides feedback control of the output of laser beam LB oscillated and output from a YAG laser oscillator 74.

The YAG laser oscillator 74 incorporates a YAG rod, pumping light generation means (a pumping lamp, a semiconductor laser or the like), an optical resonator, etc., wherein the pumping light generation means are activated in response to a pumping current from a laser output source 72, the YAG rod pumped by its optical energy issuing a light with a predetermined wavelength component, the light with a specific wavelength being resonantly amplified by the optical resonator to provide a laser beam LB. This laser beam LB is passed through a beam splitter 76 so that a part of the laser beam LB reflected thereat is directed to the beam receiving unit 10 of the laser output measuring apparatus of this embodiment.

Most of the laser beam LB which has passed through the beam splitter 76 directly impinges on a workpiece not shown via an optical lens not shown. Alternatively, it may temporarily be delivered to a beam input unit not shown and then via an optical fiber not shown to a remote beam output unit, from which it falls on the workpiece.

An electric signal $I_{LB}$ issued from the photodiode 46 of the laser output measuring apparatus is in the form of an optical current signal. The optical current signal $I_{LB}$ is converted into a voltage signal $S_{LB}$ by optical current-voltage converting circuit 78. The voltage signal $S_{LB}$ derived from the converting circuit 78 is converted into a digital signal by a sample hold circuit 80 and a digital-analog converting circuit 82, after which it is fed to a CPU 84.

The CPU 84 operates in accordance with a program stored in a memory 86 and subjects an input laser output detection signal $S_{LB}$ to a predetermined calibration, a correcting operation or the like to acquire a measurement value of the output of the laser beam LB. Then the CPU 84 compares the thus acquired laser output measurement value with a laser output set value fed from an input device 90 and stored in the memory 86 to obtain a comparison error, thereby imparting to the laser output source 72 a control signal CS nullifying the comparison error. As needed it may allow a display device 88 to provide a display of the laser output measurement value or other data. Furthermore, it imparts reference value data corresponding to a set temperature fed from the input device 90 to the reference value generator 58 within the temperature control circuit 54.

Figure 5:
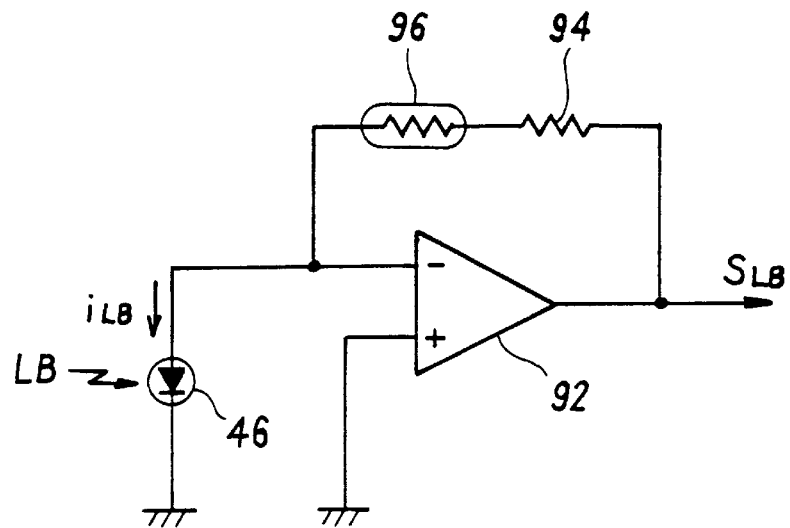
FIG. 5 is a circuit diagram showing an example of a circuit configuration of an optical current-voltage converting circuit in the embodiment.
Figure 6:
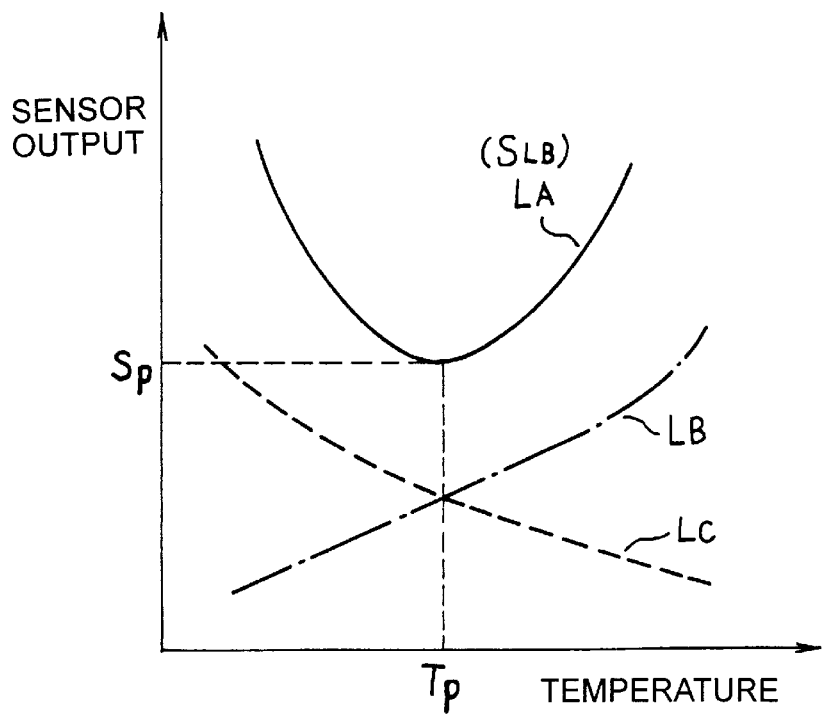
FIG. 6 illustrates temperature characteristics of the sensor output in the optical current-voltage converting circuit of FIG. 5.

FIG. 5 illustrates by way of example a circuit configuration of the optical current-voltage converting circuit 78 for use in this embodiment and FIG. 6 illustrates temperature characteristics of the sensor output in this converting circuit 78.

The optical current-voltage converting circuit 78 includes an operational amplifier 92 and feedback resistors 94 and 96. The operational amplifier 92 has a non-inverting input terminal which has been grounded and an inverting input terminal to which is connected the output terminal (anode terminal) of the photodiode 46, with the resistors 94 and 96 being connected in series between the inverting input terminal and an output terminal of the amplifier 92.

Of the feedback resistors 94 and 96, one resistor 94 is an ordinary resistor having a positive temperature coefficient but the other resistor 96 is in the form of e.g., a negative characteristic thermistor having a negative temperature coefficient.

In the optical current-voltage converting circuit 78 including the operational amplifier 92, by providing the feedback circuit in the form of a series resistor circuit consisting of the resistor 94 having a positive temperature coefficient and the resistor 96 having a negative temperature coefficient in this manner, the output voltage at the operational amplifier 92 or the sensor output (pre-correction laser output measurement value) $S_{LB}$ can have temperature characteristics shown by a solid line curve $L_A$ of FIG. 6, with its minimal sensor output $S_{LB}$ at a certain temperature $T_P$.

The temperature $T_P$ at the minimal point depends on parameters such as the temperature characteristics of the photodiode 46 and the temperature coefficients of the two resistors 94 and 96. In other words, appropriate selections of those parameters enables the minimal point temperature $T_P$ to be in the close vicinity of a desired temperature, i.e., a set temperature (e.g., 45° C.) for the temperature control.

It is to be noted in FIG. 6 that a chain-dotted line curve $L_B$ indicates temperature characteristics of the sensor output $S_{LB}$ in case the feedback circuit consists merely of the resistor 94 having a positive temperature coefficient whereas a dotted line curve $L_C$ indicates temperature characteristics of the sensor output in case the feedback circuit consists merely of the resistor 96 having a negative temperature coefficient.

By setting the minimal point $T_P$ on the temperature characteristics of the sensor output $S_{LB}$ in the optical current-voltage converting circuit 78 to be in the close vicinity of the set temperature for the temperature control in this manner, even though the controlled temperature were subjected to any possible fluctuation such as a ripple, the sensor output $S_{LB}$ would merely fluctuate in the vicinity of the minimal point $S_P$ so that its width of fluctuation could be extremely small as compared with the width of fluctuation in temperature, thus ensuring stable laser output measurement values.

Figure 7:
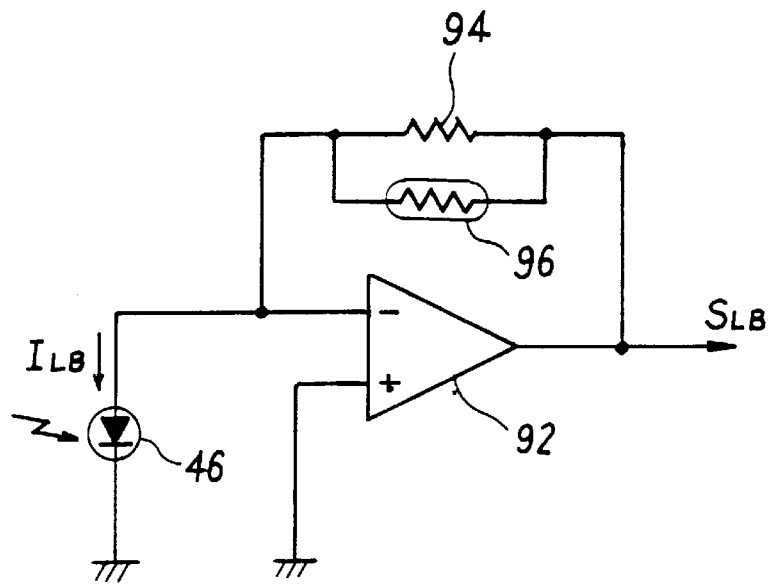
FIG. 7 is a circuit diagram showing a variant of the optical current-voltage converting circuit in the embodiment.
Figure 8:
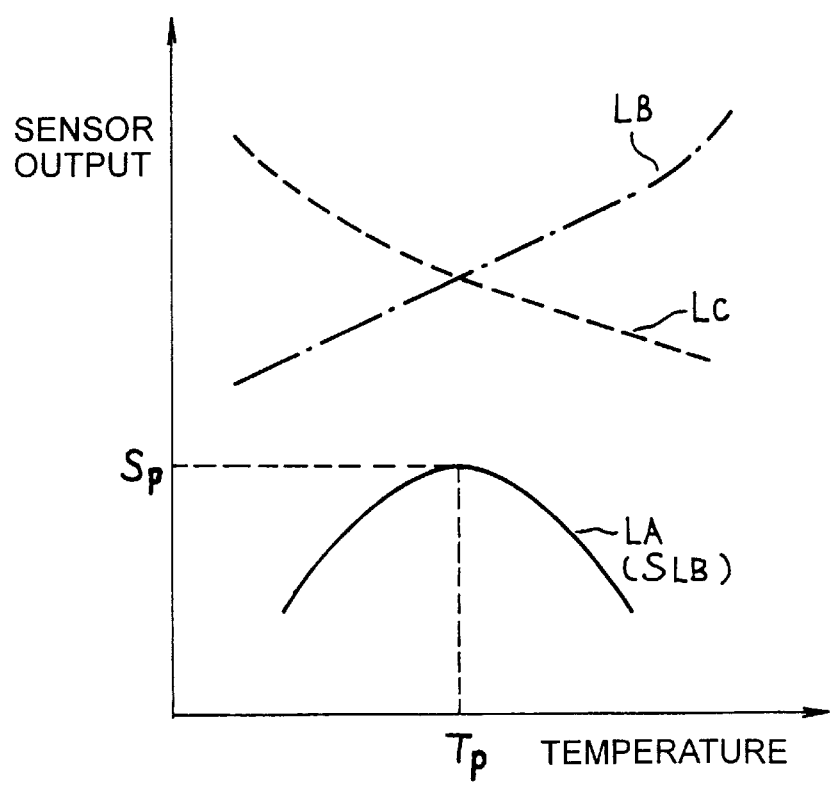
FIG. 8 is a diagram showing temperature characteristics of the sensor output in the optical current-voltage converting circuit of FIG. 7.

FIG. 7 illustrates a variant of the circuit configuration of the optical current-voltage converting circuit 78 and FIG. 8 illustrates temperature characteristics of the sensor output in the variant.

By providing the feedback circuit in the form of a parallel resistor circuit consisting of the resistor 94 having a positive temperature coefficient and the resistor 96 having a negative temperature coefficient as in this variant, the sensor output $S_{LB}$ can have temperature characteristics as shown by a solid line curve $L_A$ of FIG. 8, with its maximal sensor output $S_{LB}$ at a certain temperature $T_P$.

In this case as well, the maximal point $T_P$ on the temperature characteristics of the sensor output $S_{LB}$ is set to be in the close vicinity of a set temperature for the temperature control so that stable laser output measurement values against any fluctuations in temperature can be obtained in the same manner as the above.

It is to be appreciated in the above embodiments that the optical and mechanical configurations of the laser output measuring apparatus 10 (FIGS. 1 and 2), the configuration of the temperature control circuit 54 (FIG. 3), the configuration of the laser processing system (FIG. 4) and the configuration of the optical current-voltage converting circuit 78 (FIGS. 5 and 7) are merely by way of example and that the present invention is not intended to be limited to those configurations and could variously be modified without departing from its technical ideas.

For example, the retainer 28 for retaining the photodiode 46 could employ a diversity of geometries and structures. The positions and ways of mounting of the heating element 48 and the transistor 50 onto the retainer 28 could also variously be selected. The temperature control circuit 54 could also variously be modified and could employ other control methods than the PI control method.

What is claimed is:

1. A laser output measuring apparatus for measuring the output of a laser beam, comprising:
    a photoelectric converting element for receiving said laser beam to convert the output of said laser beam into an electric signal;
    a thermally conductive retainer for retaining said photoelectric converting element;
    a heating element secured to said retainer in a thermally coupled manner, for generating heat by the supply of electric current;
    a power transistor secured to said retainer in a thermally coupled manner, for supplying said heating element with electric power;
    a temperature sensor for detecting the temperature of said retainer; and
    a temperature control circuit for providing a control of output current from said transistor in response to an output signal from said temperature sensor so as to allow the temperature of said retainer to conform to a set temperature.

2. The laser output measuring apparatus according to claim 1, wherein said temperature control circuit includes a reference value generator for generating a reference value corresponding to said set temperature; a comparing circuit for making a comparison of said output signal from said temperature sensor to said reference value corresponding to said set temperature to generate an error signal indicative of a comparison error therebetween; an amplifying circuit for proportional control, for proportionally amplifying said error signal with a predetermined amplification factor; an integrating circuit for integral control, for integrating said error signal; an adding circuit for adding together an output signal from said amplifying circuit and an output signal from said integrating circuit; and a driving circuit for controlling said output current from said transistor with a constant current, in response to said output signal from said adding circuit.

3. A laser output measuring apparatus for measuring the output of a laser beam, comprising:
    a photoelectric converting element for receiving said laser beam to convert the output of said laser beam into an electric signal;
    an operational amplifier for accepting a current signal from said photoelectric converting element to issue a voltage signal corresponding to said current signal; and
    a feedback circuit connected between an input terminal and an output terminal of said operational amplifier, said feedback circuit including a first resistor having a positive temperature coefficient and a second resistor having a negative temperature coefficient.

4. The laser output measuring apparatus according to claim 3, further comprising temperature control means for controlling the temperature of said photoelectric converting element to a set temperature so as to allow the temperature at the maximal point or the minimal point on a temperature characteristic curve of laser output measurement values acquired at said output terminal of said operational amplifier to be adjusted in the close vicinity of said set temperature.

* * * * *